United States Patent [19]

Krüde et al.

[11] Patent Number: 4,556,400
[45] Date of Patent: Dec. 3, 1985

[54] DRIVE SHAFT ASSEMBLY FOR MOTOR VEHICLES

[75] Inventors: Werner Krüde, Siegburg-Kaldauen; Karl-Heinz Müller, Wissen; Hans-Heinrich Welschof, Rodenbach, all of Fed. Rep. of Germany

[73] Assignee: Uni-Cardan Aktiengesellschaft, Siegburg, Fed. Rep. of Germany

[21] Appl. No.: 663,818

[22] Filed: Oct. 22, 1984

Related U.S. Application Data

[63] Continuation of Ser. No. 405,197, Aug. 4, 1982, abandoned.

[30] Foreign Application Priority Data

Aug. 5, 1981 [DE] Fed. Rep. of Germany ....... 3130994

[51] Int. Cl.$^4$ ............................................. F16D 3/84
[52] U.S. Cl. ............................ 464/181; 277/212 FB; 464/140; 464/903
[58] Field of Search ............... 74/18; 174/DIG. 8; 277/212 FB, 237 R; 403/50, 51; 464/113, 140, 145, 146, 173, 175, 181, 183, 903, 906

[56] References Cited

U.S. PATENT DOCUMENTS

| | | | |
|---|---|---|---|
| 4,210,002 | 7/1980 | Dore | 464/175 |
| 4,224,808 | 9/1980 | Gehrke | 464/175 |
| 4,369,979 | 1/1983 | Krude et al. | 464/175 X |
| 4,392,838 | 7/1983 | Welschof et al. | 464/175 |

FOREIGN PATENT DOCUMENTS 1219292  6/1966  Fed. Rep. of Germany.
1596837  9/1981  United Kingdom.

OTHER PUBLICATIONS

"Alphlex Shrinkable Tubing", (Alphlex), pp. 1–4, Jun. 21, 1961.

*Primary Examiner*—Stuart S. Levy
*Assistant Examiner*—Daniel P. Stodla
*Attorney, Agent, or Firm*—Toren, McGeady, Stanger, Goldberg & Kiel

[57] ABSTRACT

A drive shaft assembly particulary suited for power transmission in motor vehicles wherein a drive shaft has a universal joint connected to at least one end thereof with a sealing boot attached in sealing engagement between the outer joint member of the universal joint and the drive shaft. The invention is particularly directed to the provision of an elastomeric cover on the outer surface of the drive shaft, the elastomeric cover extending along the shaft from the exterior of the sealing boot to within the region enclosed by the boot in order to provide an arrangement which is resistant to damage, corrosion, and wear and which may be conveniently fitted and assembled. The elastomeric cover may be provided with internal ribs to establish ventilation channels for the shaft assembly.

8 Claims, 5 Drawing Figures

DRIVE SHAFT ASSEMBLY FOR MOTOR VEHICLES

This is a continuation of application Ser. No. 405,197, filed Aug. 4, 1982, now abandoned.

The present invention relates generally to drive shaft assemblies for motor vehicles and more particularly to drive shaft assemblies which may be utilized as connecting shafts between the wheels of the motor vehicle and the output shaft of a drive unit of the vehicle. The type of assembly to which the present invention relates will include a universal joint connected to at least one end of a drive shaft with a sealing boot being provided in sealing engagement between the outer member of the universal joint and the drive shaft.

In drive shaft assemblies of the type to which the present invention relates, it is generally necessary to provide some corrosion protection for the drive or connecting shaft of the assembly. Such corrosion protection usually consists of a coat of paint applied to the shaft. However, utilization of paint as a corrosion protection gives rise to disadvantages because the paint coating has low resistance to wear and damage.

Protective devices known in the prior art, for example, German Auslegeschrift No. 1 219 292, may consist of elastomeric material such as rubber wherein the entire joint is covered with the protective coating or cover. The objective of such prior art arrangements is to ensure that the finished assembled joint is satisfactorily protected from external influences.

A further type of protective device for universal joints and associated drive shafts is known from British Patent Specification No. 1 596 837 (corresponding to German Offenlegungsschrift No. 28 04 339) wherein a pair of sealing boots covering two universal joints arranged at opposite ends of the drive shaft are constructed as a single integral elastomeric member by an integral cylindrical center piece extending between the two boots. In this design, the central portion is in running contact with the drive shaft connected between the two universal joints. However, although such a design utilizing an integral boot assembly operates to completely protect the drive shaft, such an arrangement can cause assembly problems since it is only possible to apply the protective boot to the shaft after the first universal joint has been affixed to the shaft. Accordingly, in such a device, one joint must be fitted before the protective seal is applied and only thereafter is it possible for the second universal joint or the drive shaft in the joint to be fitted.

Accordingly, the present invention is directed toward the provision of a drive shaft assembly which can be fitted without complicated assembly procedures with the drive shaft being provided with corrosion protection having a high degree of resistance to damage and wear.

SUMMARY OF THE INVENTION

Briefly, the present invention may be defined as a drive shaft assembly particularly suited for power transmission in a motor vehicle comprising a drive shaft, a universal joint including an inner joint member and an outer joint member connected to at least one end of said drive shaft, a sealing boot attached in sealing engagement between said outer joint member and said drive shaft for protectively sealing said universal joint, and an elastomeric cover on the outer surface of the shaft, said elastomeric cover being arranged to extend along the shaft from the exterior of the sealing boot to within the region enclosed by the boot.

The advantage of the arrangement in accordance with the present invention is that the drive shaft may be treated as an individual component so that subsequent assembly may proceed in the conventional manner. The advantage of the elastomeric cover as compared with the coating of paint is that a higher degree of resistance against wear and damage is achieved while at the same time facilitating assembly of the device and avoiding complicated manufacturing procedures.

In accordance with a further feature of the invention, the elastomeric cover may be provided in the form of a shrinkable sleeve which may be applied over the drive shaft by a heat shrinking operation. The use of a shrinkable sleeve is found to be particularly cost-effective. Additionally, handling of the parts is facilitated because the sleeve or foil may be pulled over the drive shaft in the form of a sleeve of heat-shrinkable plastic material whose diameter is greater than that of the drive shaft with the sleeve being subsequently shrunk by the application of heat into fitted engagement over the shaft.

In accordance with a further essential feature of the invention, the shrinkable sleeve may be formed on its inner face with at least one rib extending axially thereof in order to provide some separation between the inner surface of the sleeve and the outer surface of the shaft thereby to define ventilation channels which will extend along the axial length of the shaft.

As the temperature of the surroundings of the drive shaft assembly increases, problems frequently develop in that the sealing boots become damaged due to the development of pressures which may be either too high or too low. In order to avoid problems which arise as a result of this phenomenon, the sealing boots are generally provided with ventilation devices. However, such ventilation devices are not satisfactory since, at the wheel end of the drive shaft, the joint may be exposed to water or other undesirable substances. The advantage of the present invention is that by utilizing a shrinkable sleeve having a rib on the inner contour of the sleeve, parts of the inner surface of the sleeve are separated from the shaft thereby creating a channel or flow connection between the interiors of two universal joints connected at opposite ends of the shaft. In this manner, the joint at the wheel end is ventilated by the joint at the transmission end. Thus, advantages arise due to the utilization of the shrinkable sleeve in that it is possible to provide ventilation without incurring additional costs and while also avoiding other problems which may arise with alternative approaches for ventilating the sealing boots.

In accordance with the invention, the shrinkable sleeve or coating on the drive shaft may be formed on its inner surface with a profile which extends continuously across the entire axial length thereof. For example, the sleeve may be formed with a multiplicity of axially extending channels extending about the entire inner circumference of the sleeve. The advantage of such a design is that a large number of channels will be provided connecting the two universal joints at the ends of the drive shaft thereby permitting rapid relief of pressure changes which may occur.

A further advantage of the invention arises due to the fact that unlike other materials such as paints, chromium, or rilsan, the shrinkable sleeve is not adhered to the surface of the shaft in such a manner that it may not be removed. Therefore, this provides a further advantage in that, unlike other known shaft coatings, the sleeve may be easily removed and, if required, the material thereof may even be reused or regranulated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
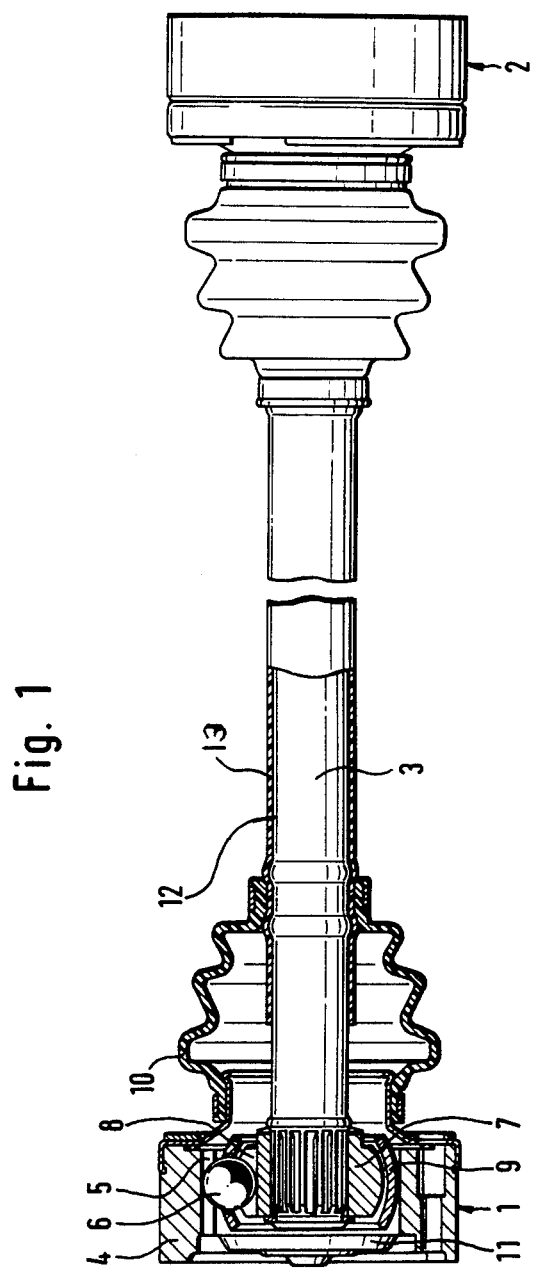
FIG. 1 is an axial view partially in section of a drive shaft assembly embodying the present invention.

Referring now to FIG. 1, there is shown a drive shaft assembly comprising a drive shaft or connecting shaft 3 having a pair of constant velocity universal joints 1 and 2 attached at opposite ends thereof. In the case of the embodiment depicted by way of example in FIG. 1, the constant velocity universal joints 1 and 2 are in principle of the same construction so that, in the disclosure which follows, only one of the joints will be described in detail.

As indicated in FIG. 1, the universal joint 1 is constructed to consist of an outer joint member 4 having a cylindrical hollow inner space which is provided with grooves 5 for receiving therein torque transmitting balls 6. Furthermore, the connecting or drive shaft 3 carries at the end thereof an inner joint member 7 of the universal joint 1. The circumferential face of the inner joint member 7 is provided with grooves 8 which cooperate with the grooves 5 of the outer joint member 4, with one each of the grooves 5 and 8 respectively arranged to receive a ball 6 in order to effect torque transmission between the inner and outer joint members. The balls 6 are guided in the windows of a cage 9 arranged between the inner and outer joint members 7, 4.

In the case of the joint depicted in FIG. 1, the cage 9 has an inner ball face guided on the outer face of the inner joint member 7 and an outer face which is arranged so as to be axially movable in the inner hollow space of the outer joint member 4. At its end facing the joint 1, the connecting shaft is provided with a wedged profile and is received in a corresponding bore of the inner joint member 7.

To prevent the penetration of dust, dirt, water, or other deleterious material, a sealing boot 10 is provided which extends in sealing engagement between the shaft 3 and the outer joint member 4. A sealing cap 11 is provided on the end of the joint opposite the end connected with the sealing boot 10.

In accordance with the present invention, the outer surface 12 of the connecting or drive shaft 3 is provided with a coating 13 which is formed of elastomeric material and which operates to protect the shaft against corrosion, damage, and wear. The elastomeric coating may comprise a plastic material.

Figure 2:
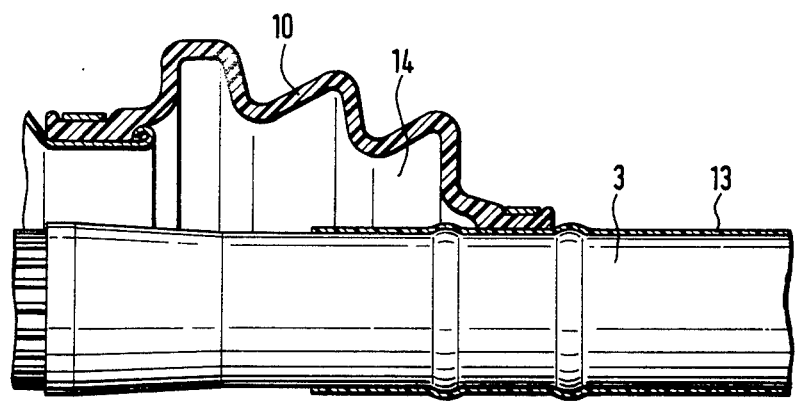
FIG. 2 is a partial axial sectional view illustrating in greater detail a portion of the drive shaft assembly of the invention.

The assembly of the invention is shown in greater detail in FIG. 2. As indicated therein, the elastomeric cover 13 is provided in the form of a heat-shrinkable sleeve which may be first loosely fitted over the shaft 3 and then shrunk by the application of heat into tight fitted engagement thereabout. As indicated in FIG. 2, the shrinkable sleeve 13 is arranged to extend along the connecting shaft 3 from externally of the boot 10 into the interior 14 of the sealing boot 10. That is, the shrinkable sleeve 13 extends to the interior 14 of the boot 10 across the point at which the boot is arranged in sealing engagement with the shaft 3. Thus, the shrinkable sleeve 13 will provide secure protection from the outer atmosphere for the interior of the boot 10.

Figure 3:
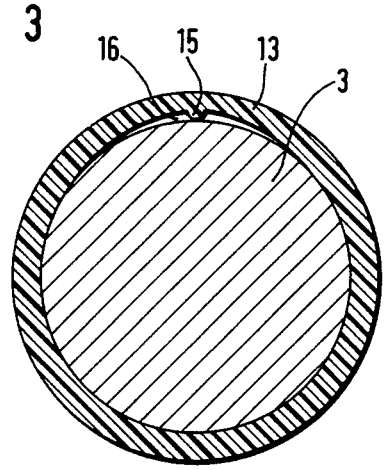
FIG. 3 is a cross-sectional view of the shaft assembly shown in FIG. 2.

A further feature of the invention is depicted in FIG. 3 which shows the assembly of the shaft 3 and the shrinkable sleeve 13 in sectional end view. As shown in FIG. 3, a rib 15 is formed on the interior surface of the sleeve 13 and as a result of the formation of the rib 15, portions of the inner surface of the sleeve 13 are separated from the outer surface of the shaft 3 in order to form channels 16. The rib 15 is formed to extend axially across the entire inner face of the shrinkable sleeve 13 as far as the interior of the sealing boot 10 of the two universal joints 1 and 2. Thus, as a result of this arrangement, connecting channels 16 will be provided which extend between the two joints. The connecting channels 16 will equalize the pressure in the joints if the pressure in one of the two joints becomes either too high or too low.

Additionally, if the joint at the transmission end is provided with a channel leading into the free atmosphere, the joint at the wheel end will be hermetically sealed against the atmosphere and pressure equalization with the atmosphere may be effected through the channels 16 and through the joint at the transmission end thereby avoiding potentional damaging exposure of the joint at the wheel end.

Of course, the sleeve 13 may be provided with a plurality of ribs 15 in order to form a greater number of channels thereby to achieve more rapid pressure equalization.

Figure 4:
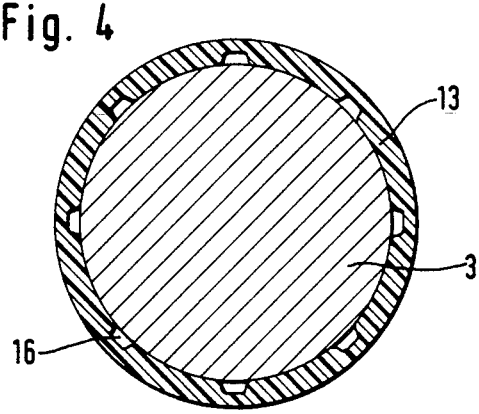
FIG. 4 is a cross-sectional view showing a further embodiment of the invention.

Alternatively, as shown in the embodiment of FIG. 4, the inner surface of the sleeve may be provided with concavities which will form the channels 16. As indicated in the embodiment depicted in FIG. 4, the connecting shaft 3 is coupled with a shrinkable sleeve 13 wherein a plurality of concavities or recesses are formed on the inner surface of the sleeve 13 as a result of which a plurality of chanels 16 are produced around the circumference of the shaft 3.

Figure 5:
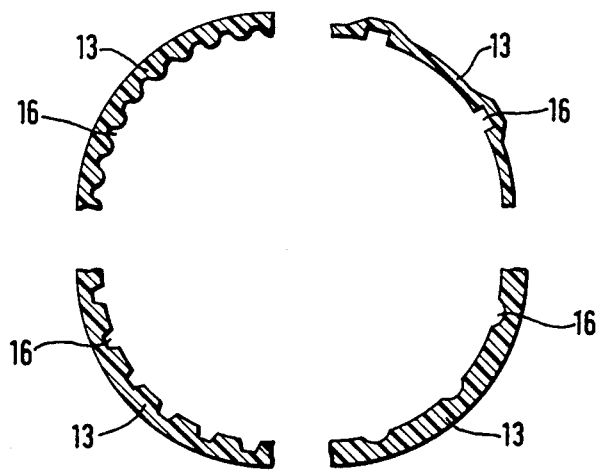
FIG. 5 is a fragmented sectional view depicting other embodiments of the invention.

Further embodiments of the invention are depicted in FIG. 5. FIG. 5 shows four different structural embodiments of the shrinkable sleeve 13 each having a different inner profile. It will be apparent from FIG. 5 that in each case corresponding connecting channels 16 are provided which extend axially along the shaft 3 on the interior of the sleeve 13 to enable pressure equalization.

While specific embodiments of the invention have been shown and described in detail to illustrate the application of the inventive principles, it will be understood that the invention may be embodied otherwise without departing from such principles.

What is claimed is:

1. A drive shaft assembly particularly suited for power transmission in a motor vehicle comprising a drive shaft, universal joint means including an inner joint member and an outer joint member connected to at least one end of said drive shaft, a sealing boot attached in sealing engagement between said outer joint member and said drive shaft for protectively sealing said universal joint means, and an elastomeric cover on the outer surface of said drive shaft, said elastomeric cover extending along the axial length of said drive shaft from the exterior of said sealing boot to within the region enclosed by said sealing boot on the interior thereof, wherein said universal joint means comprise a pair of universal joints attached at opposite ends of said drive shaft and wherein a sealing boot is attached in sealing engagement between each of said universal joints and said drive shaft, said elastomeric cover extending along the entire length of said drive shaft between said sealing boots to within the interior of each of said sealing boots, said elastomeric cover further comprising means defining channels on the interior of said elastomeric cover between said elastomeric cover and said drive shaft, said channels operating to place the interiors of both said sealing boots in flow communication with each other to enable pressure equalization therebetween.

2. An assembly according to claim 1 wherein said means defining said channels comprise recess means formed in said elastomeric cover.

3. An assembly according to claim 1 wherein said shrinkable sleeve comprises a heat-shrinkable plastic sleeve which is first loosely applied over said drive shaft and then shrunk in fitted engagement thereabout by application of heat.

4. An assembly according to claim 1 wherein said means defining said channels comprise rib means formed on the interior of said elastomeric cover.

5. An assembly according to claim 4 wherein said rob means comprise a single axially extending rib formed on the interior of said elastomeric cover.

6. An assembly according to claim 4 wherein said rib means comprise a plurality of axially extending ribs formed on the interior of said elastomeric cover circumferentially spaced about said drive shaft.

7. An assembly according to claim 1 wherein said elastomeric cover is formed of heat-shrinkable plastic material.

8. A drive shaft assembly particularly suited for power transmission in a motor vehicle comprising a drive shaft, universal joint means including an inner joint member and an outer joint member connected to at least one end of said drive shaft, a sealing boot attached in sealing engagement between said outer joint member and said drive shaft for protectively sealing said universal joint means, and an elastomeric cover on the outer surface of said drive shaft, said elastomeric cover extending along the axial length of said drive shaft and into a second boot surrounding said shaft to provide a corrosion protective covering therefor from the exterior of said sealing boot to within the region enclosed by said sealing boot on the interior thereof, said elastomeric cover comprising a sleeve which has been applied to said drive shaft with a shrink fit, said elastomeric cover being formed on the interior surface thereof with means defining exclusively axially extending channels located between the outer surface of said drive shaft and the interior of said elastomeric cover to also provide for venting of said sealing boot.

* * * * *